S. L. ALLEN, DEC'D.
S. H., C. J., E. R. AND S. J. ALLEN AND E. A. ELFRETH, EXECUTORS.
AGRICULTURAL IMPLEMENT.
APPLICATION FILED FEB. 5, 1917.
1,338,273. Patented Apr. 27, 1920.
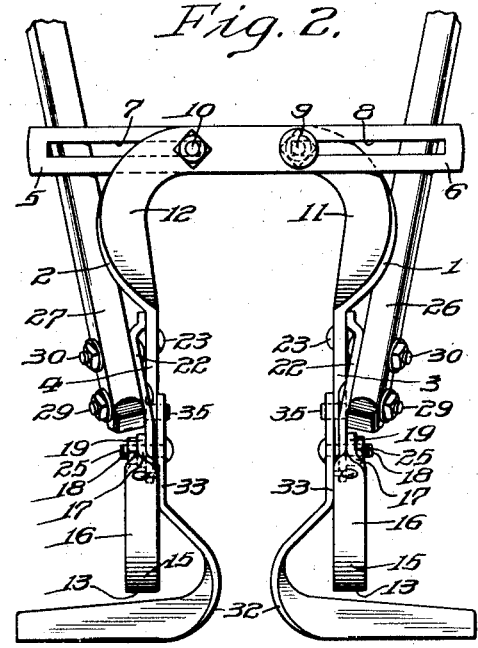
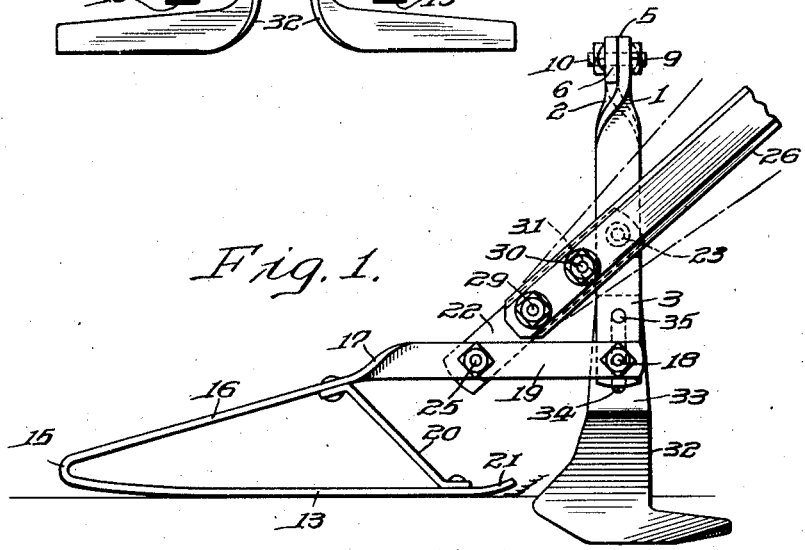

UNITED STATES PATENT OFFICE.

SAMUEL L. ALLEN, OF MOORESTOWN, NEW JERSEY; SARAH H. ALLEN, CHARLES J. ALLEN, ELIZABETH R. ALLEN, SUSAN J. ALLEN, AND EMILY ALLEN ELFRETH, EXECUTORS OF SAID SAMUEL L. ALLEN, DECEASED.

AGRICULTURAL IMPLEMENT.

1,338,273.     Specification of Letters Patent.     Patented Apr. 27, 1920.

Application filed February 5, 1917. Serial No. 146,654.

*To all whom it may concern:*

Be it known that I, SAMUEL L. ALLEN, a citizen of the United States, residing at Moorestown, in the county of Burlington and State of New Jersey, have invented certain new and useful Improvements in Agricultural Implements, whereof the following is a specification, reference being had to the accompanying drawings.

My invention relates particularly to cultivating implements, and is especially directed to that class of manually propelled devices, commonly known as slide hoes, which are conveniently provided with slides or runners by which ground working tools are carried, and with operating handles by which they may be progressed.

The principal objects of my invention are to provide an implement of the class described which is simple in its construction, inexpensive to manufacture, easily repaired, having readily replaceable parts, and which affords great strength, and a wide range of adjustment.

Other objects of my invention are to provide an implement wherein the slide or runner is extended to form an essential part of the frame.

Specifically stated one form of my invention as hereinafter described comprehends laterally adjustable tool carrying members connected with extensions on the supporting slides or runners, and maintained in rigid relation therewith by diagonally disposed brace bars, to which operating handles may be adjustably attached.

My invention also includes all of the other various novel features of construction and arrangement hereinafter more definitely specified.

In the accompanying drawings Figure 1 is a side elevational view of an implement constructed in accordance with my invention, and Fig. 2 is a front elevational view of said implement.

In said figures the frame comprises the duplicate arch members 1 and 2 respectively having tool carrying depending legs 3 and 4 and transverse arms 5 and 6 which are provided with slots 7 and 8 through which adjusting bolts 9 and 10 respectively extend, and by which the frame members 1 and 2 are rigidly held together in any desired adjusted position.

The arms 5 and 6 are connected with the legs 3 and 4 of the respective frame members 1 and 2 by outwardly swinging curved portions 11 and 12, which are twisted to dispose said legs in relatively transverse parallel planes as best shown in Fig. 2.

The frame thus described is arranged to be carried by suitably formed slide runners 13 which are preferably formed of flat strap metal, and have their forward ends 15 upturned and bent back, providing the rearwardly inclined portions 16 twisted at 17 into a vertical plane and extended horizontally to provide the extensions 19 to which the depending legs 3 and 4 are connected by bolts 18.

Each of the slide runners 13 and their frame supporting extensions 19 comprise a unitary structure, provided with the spacer bar 20 connected with the runner 13 adjacent to its upturned rear end 21, inclined upwardly toward the front of said runner and connected with the rearwardly inclined portion 16 forward of the twisted region 17.

The legs 3 and 4 of the frames 1 and 2 are arranged to be held in substantially normal relation to the runner extensions 19 by the obliquely disposed brace bars 22, which are secured to the legs 3 and 4 by bolts or rivets 23 and to the extensions 19 by the bolts 25, and which serve as handle brackets for the handle bars 26 and 27.

Said handle bars 26 and 27 are pivotally connected with the respective brace bars 22 by the bolts 29 and are adjustably engaged therewith in variable positions, as indicated by the dot and dash lines, by the bolts 30 which extend through the slots 31 in said respective brace bars 22 as shown in Fig. 1, said slots serving to limit the adjustment of the handles to vary their height with respect to the surface of the ground being worked upon.

The depending legs 3 and 4 are arranged to carry tools 32 which may be of any desired form, each having the shank 33 provided with the slot 34 through which the bolts 18 may extend to hold the tool adjusted in different vertical positions, and through which the projections 35 on the legs 3 and 4 extend, to maintain the tool in vertical alinement.

It will be obvious that the slide runners 13 will tend to maintain the frame in a definite relation to the surface of the ground, that is the legs 3 and 4 will be supported in a vertical position, and the tools therefore will be uniform in their action.

It may be here noted that any thrust upon the handle bars 26 and 27 irrespective of their adjusted position will not only tend to progress the runners along the ground but will tend to maintain them parallel with the surface of the ground.

Having thus described my invention, I claim:

1. An implement of the class described, comprising frame members having depending legs, a support for said frame members, provided with slide runners, and connected with said legs, and a brace bar obliquely connecting said legs and supports to form a rigid structure.

2. An implement of the class described, comprising frame members having depending tool carrying legs, supporting slide runners formed of flat strap turned upwardly and bent backwardly, twisted and extended in a vertical plane, for supporting said frame members, and brace bars extending in divergent planes disposed obliquely between said legs and extension and connecting them together to form a rigid triangular structure, and handle bars adjustably connected with said brace bars.

3. An implement of the class described, comprising laterally adjustable frame members having depending tool carrying legs, tools adjustable vertically thereon, supporting slide runners formed of flat strap bent backwardly, twisted transversely, extended horizontally and connected in right angled relation with said legs and extensions of the runners and brace bars connecting said legs and extensions of the runners, and forming the hypotenuse of a right angled frame structure.

In testimony whereof, I have hereunto set my hand in the presence of two subscribing witnesses.

SAMUEL L. ALLEN.

Witnesses:
 EDWARD W. HURT,
 EDWARD L. RICHIE.